Dec. 26, 1933.       H. L. PATZER       1,941,316
UPPER CUTTING MACHINE
Filed March 30, 1932
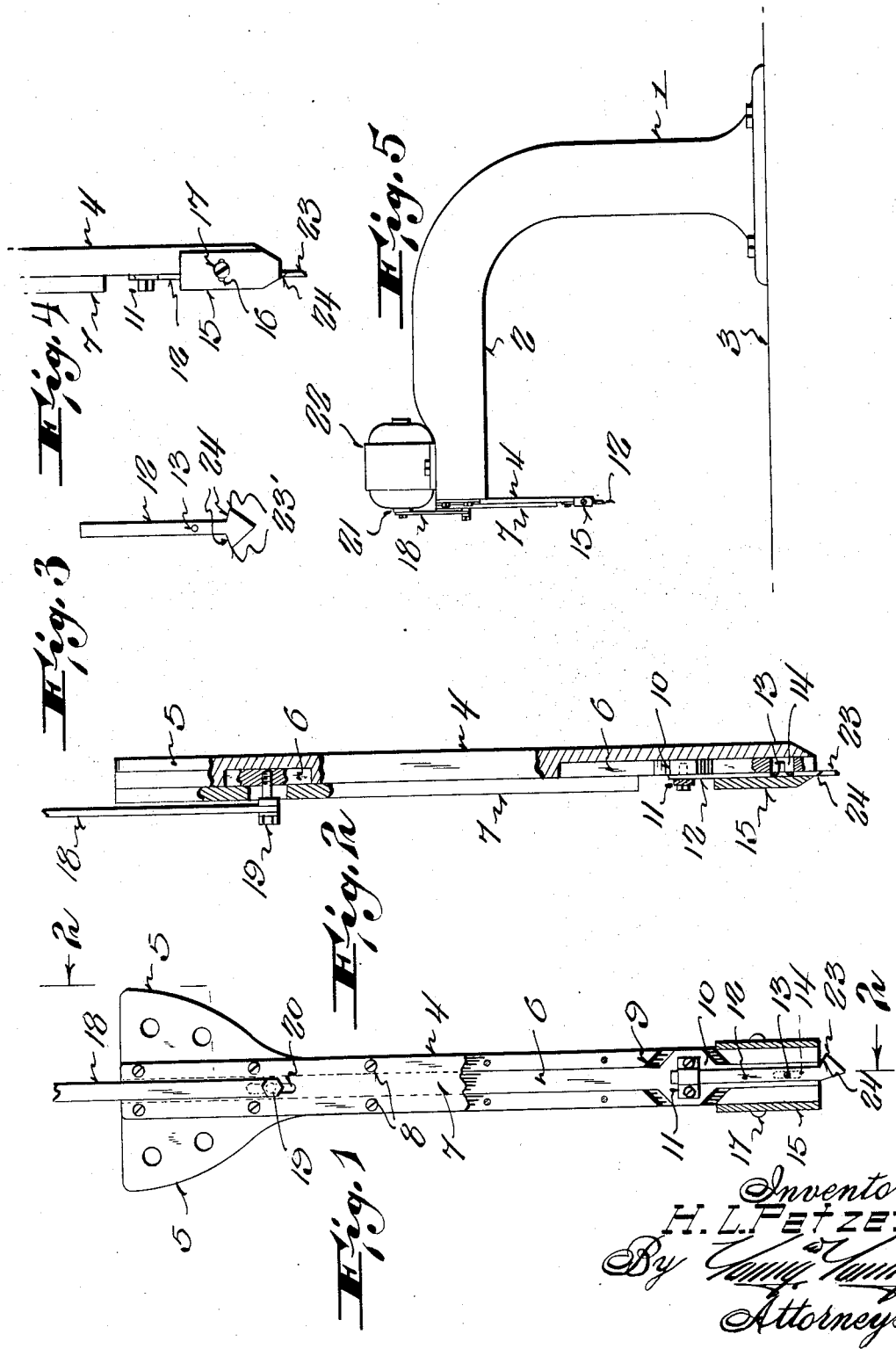

Patented Dec. 26, 1933

1,941,316

UNITED STATES PATENT OFFICE 1,941,316

UPPER CUTTING MACHINE

Henry L. Patzer, Milwaukee, Wis.

Application March 30, 1932. Serial No. 601,993

3 Claims. (Cl. 164—47)

This invention pertains to a cutting machine, and more particularly to a machine for cutting out certain portions of a shoe upper to provide openings of miscellaneous shapes and design.

At the present time, it is customary to ornament shoes, particularly women's shoes, by cutting out the uppers at various places, both in plain and fanciful design. This is necessarily accomplished after the upper and lining have been stitched together and secured to the sole, the stitching on the upper defines the contour of the cutout portions, which must be cut closely adjacent the stitching in order to provide a neat appearing finish.

At the present time the foregoing operation is performed largely by hand. However, attempts have been made to provide a machine utilizing a reciprocative knife, which functions in connection with a mandrel positioned on the interior of the shoe, the knife cutting on the down stroke. This structure has been found to be objectionable, in that considerable difficulty is encountered in turning the shoe on the mandrel, in order that the knife may follow the irregular contour and design of the cutout.

Therefore, the present invention has primarily for its object to overcome the foregoing difficulties, by the provision of an extremely simple, inexpensive and efficient upper cutting machine, which can readily follow irregular contours and designs of cutout, and which has no obstruction to interfere with the free manipulation of the shoe during the cutting operation.

Incidental to the foregoing, a more specific object resides in the provision of a machine having a reciprocative knife cooperating with its guide to effect cutting operation upon retraction of the knife within the guide.

A more detailed object resides in the provision of a machine comprising a lateral support having a depending guide secured to its front face and provided with a reciprocative knife functioning in cooperation with the guide to perform a cutting operation upon the up-stroke of the knife.

With the above and other objects in view, which will appear as the description proceeds, the invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:—

Figure 1 is a front elevation of the guide and reciprocative knife, with parts broken away and in section to more clearly illustrate structural features.

Figure 2 is a side elevation with parts broken away and in section, as indicated by the line 2—2 of Figure 1.

Figure 3 is a detailed elevation of a modified form of cutting knife.

Figure 4 is a fragmentary side elevation of the guide and shear plate, and

Figure 5 is an elevation of a complete machine constructed in accordance with one form of the invention.

Referring now more particularly to the accompanying drawing, the numeral 1 designates a support, which in the present instance is in the form of a goose-neck to provide a lateral arm 2, spaced above the table or bench 3, to which the support is secured. Obviously, other shapes of supports may be utilized, depending upon the method of attachment, the essential feature residing in a lateral arm spaced above the bench or table to permit free access to the cutting knife, as will be hereinafter described.

Secured to the front face of the lateral arm 2 is a channel guide 4, provided with lateral flanges 5 adjacent its upper end, for attachment to the face of the arm, by screws or other suitable means, thus causing the guide to depend downwardly from the arm 2, as best illustrated in Figure 5.

Slidably mounted within the channel guide 4 is a sliding bar 6, which is retained within the guide by means of a cover plate 7 secured to the front thereof by screws 8, or other suitable means. Adjacent the lower end of the guide, but spaced therefrom, the sides of the channel are cut away at 9 to provide clearance for the enlarged portion 10 provided on the sliding bar 6, and which has secured thereto a clamp 11 which engages the upper end of the cutting knife 12 to lock the same in vertical adjusted position on the bar 6. In order to prevent lateral movement of the knife 12 within the clamp 11, the knife is provided with a pin 13 projecting into a longitudinal slot 14 provided in the lower end of the bar 6, thus permitting vertical adjustment of the knife within its clamp, and at the same time eliminating lateral movement.

Cooperating with the knife 12 is a channelled shear plate 15, which also serves to retain the lower portion of the knife against outward movement. Here it will be noted that the sides of the plate 15, which straddle the channel guide 4, are slotted at 16 for reception of the retaining screws 17, thus permitting lateral adjustment of the shear plate with respect to the cutting knife. Reciprocative movement of the sliding bar 6, and the cutting knife carried thereby, is obtained by means of a link 18 secured to the sliding bar by a stud 19 passing through a slot 20 in the cover plate 7. The upper end of the link 18 is secured to a crank or pitman 21 mounted on the armature shaft of an electric motor 22 carried by the lateral arm 2 of the support. Obviously, rotation of the pitman will impart rapid reciprocative movement to the sliding bar 6, causing the knife to be projected and retracted within the channel.

As best shown in Figure 1, the lower end of the cutting knife is pointed in shape and provided with a lateral offset portion 23, the upper edge 24 of which performs the cutting operation in connection with the shear plate 15, upon the upstroke or retraction of the knife within the channel guide. The knife structure just described is designed to cut in one direction only. However, in instances where it is desired to cut the leather in two directions, the modification illustrated in Figure 3 may be employed, in which the knife 12 is provided with a pair of lateral offset portions 23', the upper edges of which are sharpened to function in cooperation with the lower edge of the shear plate 15.

In operation, the upper is pierced by the pointed end of the cutting knife, to position the cutting edge 23 interiorly of the upper. Reciprocation of the knife, through the driving mechanism heretofore described, will then cause the cutting edge to sever the material on the up-stroke, and inasmuch as the knife is reciprocated at a high rate of speed, the material may be fed rapidly thereto and turned in any direction to cause the knife to follow the contour or design of the cutout.

It will further be appreciated that no obstructions are provided to interfere with free turning or manipulation of the shoe, essential to following numerous designs, and inasmuch as the operator's hands are both free to manipulate the work, the same is accomplished rapidly and neatly, inasmuch as the operator has free visibility of the work.

Obviously, from the foregoing explanation, taken in connection with the accompanying drawing, it will be readily seen that an extremely simple, inexpensive and efficient cutting machine has been provided, which materially reduces the cost of the cutting operation, performs better work, and increases production to a maximum.

I claim:—

1. A machine of the class described comprising a lateral arm, a vertical depending guide carried by said arm, a shear plate carried by the lower end of said guide, a knife reciprocatively mounted within said guide and cooperating with said shear plate to effect a cutting operation upon retraction of said knife within said guide, and a piercing operation upon projection and means for actuating said knife.

2. A machine of the class described comprising a lateral arm, a vertical depending channel guide secured to the forward end of said arm, a shear plate adjustably carried by said guide at its lower end, a knife reciprocatively mounted in said guide and cooperating with said shear plate to effect the cutting operation upon retraction of said knife within said guide, and a piercing operation upon projection and means for actuating said knife.

3. A machine of the class described comprising a support, a knife vertically and reciprocatively guided by said support and cooperating therewith to effect a cutting operation upon retraction of the knife within said support, and effecting a piercing operation upon projection, said knife having a pointed end, and a laterally offset cutting edge above said point.

HENRY L. PATZER.